United States Patent [19]

Loggers et al.

[11] Patent Number: 4,490,178
[45] Date of Patent: Dec. 25, 1984

[54] GRANULATED MATERIAL

[75] Inventors: Hendrik Loggers, Amerongen; Gijsbert Versteeg, CK Nunspeet, both of Netherlands

[73] Assignee: Aarding Weerstandlas B.V., Netherlands

[21] Appl. No.: 474,835

[22] Filed: Mar. 11, 1983

Related U.S. Application Data

[62] Division of Ser. No. 254,560, Apr. 15, 1981, abandoned.

[30] Foreign Application Priority Data

Apr. 17, 1980 [NL] Netherlands ......................... 8002251
Apr. 17, 1980 [NL] Netherlands ......................... 8002252

[51] Int. Cl.$^3$ ................................................ C04B 7/34
[52] U.S. Cl. .................................... 106/118; 106/120; 106/DIG. 1
[58] Field of Search ............... 106/117, 118, 119, 120, 106/DIG. 1

[56] References Cited

U.S. PATENT DOCUMENTS

| 2,400,884 | 5/1946 | Lloyd | 106/120 |
| 3,192,060 | 6/1965 | Tilsen | 106/120 |
| 3,725,032 | 4/1973 | Kihlstedt | 106/120 |

Primary Examiner—James Poer
Attorney, Agent, or Firm—Burton, Parker & Schramm

[57] ABSTRACT

Granulated material, at least comprising a filler, being bound by an inorganic binder, which filler consists at least partially of a substance possessing latent hydraulic properties, in the form of a substance possessing pozzolanic properties, preferably fly ash, and process for obtaining said material by starting from a calcium oxide product, silica granulate and water in which a portion of the heat development is absorbed by said granulate and is recuperated.

5 Claims, 2 Drawing Figures

GRANULATED MATERIAL

This application is a division of application Ser. No. 254,560, filed Apr. 15, 1981, now abandoned.

BACKGROUND OF THE INVENTION

1. Field of the Invention

The present invention relates to granulated material, comprising at least a filler being bound by an inorganic binding agent.

2. Description of the Prior Art

Granulated material of this type, formed by granulating a mixture of calcium hydroxide obtained by slaking commercial calcium, silica dioxide containing material and pyrites ash, has been used in the art. After sufficiently great granules have been formed in said process, said granules are subsequently coated with a mixture of calcium hydroxide and, for instance, ground sand, so that a coating consisting of calciumhydroxide and silica oxide containing substances is formed upon the granules, whereupon the obtained material is hydrothermally cured.

Despite the fact that said known granulated material has many attractive characteristics, it is unsatisfactory, as rather large quantities of a hydraulic binder are required for obtaining granulated material having the desired strength properties. Furthermore, an expensive apparatus is required for the respective treatments.

SUMMARY OF THE INVENTION

It is therefore a primary object of the present invention to provide a granulated material, the particles of which possess great strength properties, whilst a considerable economy on energy is obtained.

This object is attained in accordance with the present invention in that the filler consists at least partially, of a substance having latent hydraulic properties, said latent hydraulic properties having been activated by a heat treatment of over 30° C.

Due to the use of a filler having latent hydraulic properties, which may be activated by a heat treatment, granulated material having the desired hardness, is rapidly obtained.

Said curing is especially accomplished by the reaction between the said filler and the hydraulic binder if cement is employed for that aim.

In a very favorable embodiment of the invention the filler consists of a substance possessing pozzolanic properties, more particularly fly ash.

Said fly ash is, as is known per se, emitted on a large scale during the combustion of fossil solid fuels, such as e.g. coal or brown coal.

Although said fly ash has been used as a filler in concrete, the fact has emerged that concrete containing fly ash will only possess the desired strength properties after a very long period of curing, this contrary to concrete made with cement as a hydraulic binder.

The latent hydraulic properties are advantageously activated by a heat treatment above 30° C., by introducing the granules into a fluid in which heat will prevail.

Such a fluid may for instance consist of the liquid reactive fluid formed by reaction of two substances, while developing heat.

The present invention is likewise embodied in a process of forming granulated material, comprising at least a binder being bound by an organic binder, such as a hydraulic binder, a filler being received in a granulated material which filler at least partially consists of a substance possessing latent hydraulic properties, said latent hydraulic properties being activated by a heat treatment above 30° C.

Said heat treatment is advantageously effected at a temperature above 50° C. and more preferably at 100° C.

A suitable filler having latent hydraulic properties, is a substance, possessing pozzolanic properties, more particularly fly ash.

It has appeared that in the abovedescribed manner granulated material having the desired strength properties is very rapidly obtained, so that the said material may be used as a material replacing gravel in concrete.

The volume weight of the particles is advantageously adjusted by adding foaming means, blowing means respectively, such as casein, aluminium powder respectively, to the relative product. A gas development will then form whether or not closed cells in the granules.

The present invention also relates to a process of making a calcium hydroxide containing product, by using a calcium oxide product and water while developing heat.

Slaking calcium oxide causes much heat to be emitted in view of which said reaction has to be carefully controlled so that the respective process gets very expensive.

In order to produce hydrothermally cured products, it is known per se to mix a silica oxide containing product in the form of sand particles with calcium oxide and water. Because of the reaction of calcium oxide with water, heat will escape, which is adsorbed in the mixture by the sand and the used water. Said process is unsatisfactory as a calcium ratio exceeding 10% of the mixture causes the temperature of said mixture to become too high, so that an explosive steam is produced causing the mixture of calcium and sand particles to be ejected from the reaction zone, which zone is in most cases an autoclave.

The latter phenomenon is very disadvantageous as e.g. 23% of calcium oxide need be used in order to produce hydrothermally cured products, containing powdered quartz. From the foregoing it follows that said products cannot be made in a known manner, by mixing powdered quartz with the finally desired quantity of calcium, unless rather expensive provisions are realized. On the other hand, the known process is unsatisfactory in that mixtures containing greater quantities of calcium oxide cannot possibly be prepared. Therefor the heat developed due to mixing cannot be recovered at a high level and the respective mixture cannot be mixed with e.g. an additional quantity of silica containing products. If the latter possibility could be realized as yet, rather small autoclaves could be used for mixing and finally a further dilution of the mixture by means of silica containing products or fillers in mixers known per se, could be effected.

An additional disadvantage of the latter process is, that very great quantities of material have to be conveyed through the autoclave, which involves a notable consumtion of energy.

Thus the present invention also aims to provide a process of producing a mixture of calcium hydroxide containing product and water, more particularly mixtures of at least a silica containing product, with a calcium oxide product and water, while developing heat, in which heat absorbing particles are added to the calcium oxide product or to the mixture, which particles are removed after a calcium hydroxide containing final product has been produced.

Adding removable heat absorbing particles, incurs an operation with great quantities of calcium oxide, since the heat developed when binding calcium oxide with water, is directly absorbed in the heat absorbing particles, without any danger of an explosive steam formation occurring.

By subsequently removing said removable heat absorbing particles from the said final product, a mixture is finally obtained which possesses a very high calcium contents.

In this manner it is, for instance, possible to prepare mixtures of powdered quartz and calcium oxide, wherein the calcium oxide amounts to 23%. By hydrothermally curing said mixtures, shaped products having particular properties can be obtained.

The removed heat absorbing particles are advantageously conveyed through a heat discharge zone, for instance a liquid fluid bath, in which the heat absorbing particles transmit their heat to the liquid fluid, which fluid may be subsequently used for heating operations.

As in the process in accordance with the invention, the heat absorbing particles will obtain a high temperature, said heat may also be recovered at a high level and may therefore also be used for, for instance, city heating circuits.

The heat absorbing particles effectively consist of silicate-granulate, such as e.g. gravel particles, as particles of that type permit an optimum absorption of the heat developed during the mixing procedure.

In a specially beneficial embodiment the heat absorbing particles at least partially consist of a reactive mixture, which can be cured by a thermal treatment.

The heat, derived from mixing, may in this manner advantageously be used directly, for curing a reactive mixture or for another conversion of a reactive mixture.

In a very favorable embodiment of the present invention the heat absorbing particles consist of cured products obtained by the reaction of a calcium oxide product and a silica oxide containing product, preferably in the presence of at least a filler.

Particles, which are very suitable for that aim, consist thereby of a core of a filler with calcium oxide and silica dioxide containing material, whereby the core, however, obtains insufficient strength properties in view of the employed small quantities of a binder, such as e.g. fly ash, pyrites ash, plaster, carbon containing material and the like. So as to give said particles a sufficient hardness, a mixture of calcium hydroxide and silica dioxide containing substances, for instance, ground sand is spread upon the respective particles, thus providing said particles with a coating which is subsequently hydrothermally cured.

The entire curing operation is e.g. carried out in an autoclave under steam pressure.

The process in accordance with the present invention permits the products thus obtained—which e.g. contain cement as a binder, after a precuring, which has, however, not yet optimally been effected—to be subsequently cured by employing the relative particles as removable heat absorbing particles.

The advantageous result of the above procedure is that a notable economy on steam will be obtained for hydrothermally curing the respective products up to the desired strength, as now the heat derived from the abovementioned mixture of silica oxide and calcium oxide containing substances, may be used for a further curing of the said products.

The volume weight of the particles can advantageously be controlled by introducing a foaming means or blowing means, such as casein or aluminium powder, into said heat absorbing particles. A product is then obtained having whether or not closed cells and a volume weight comprised between 0,3 to 1,8 kg/l.

The present invention is also embodied in an apparatus for effecting the process according to the present invention, comprising a mixing vessel, provided with at least a calcium oxide product inlet, an inlet for liquid fluid and a mixing vessel outlet, said apparatus being provided with an inlet for the supply of removable heat absorbing particles and separating means for separating said removable heat absorbing particles from the obtained product in the mixing vessel outlet.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is an apparatus according to the invention.

DESCRIPTION OF THE PREFERRED EMBODIMENTS

Figure 2:
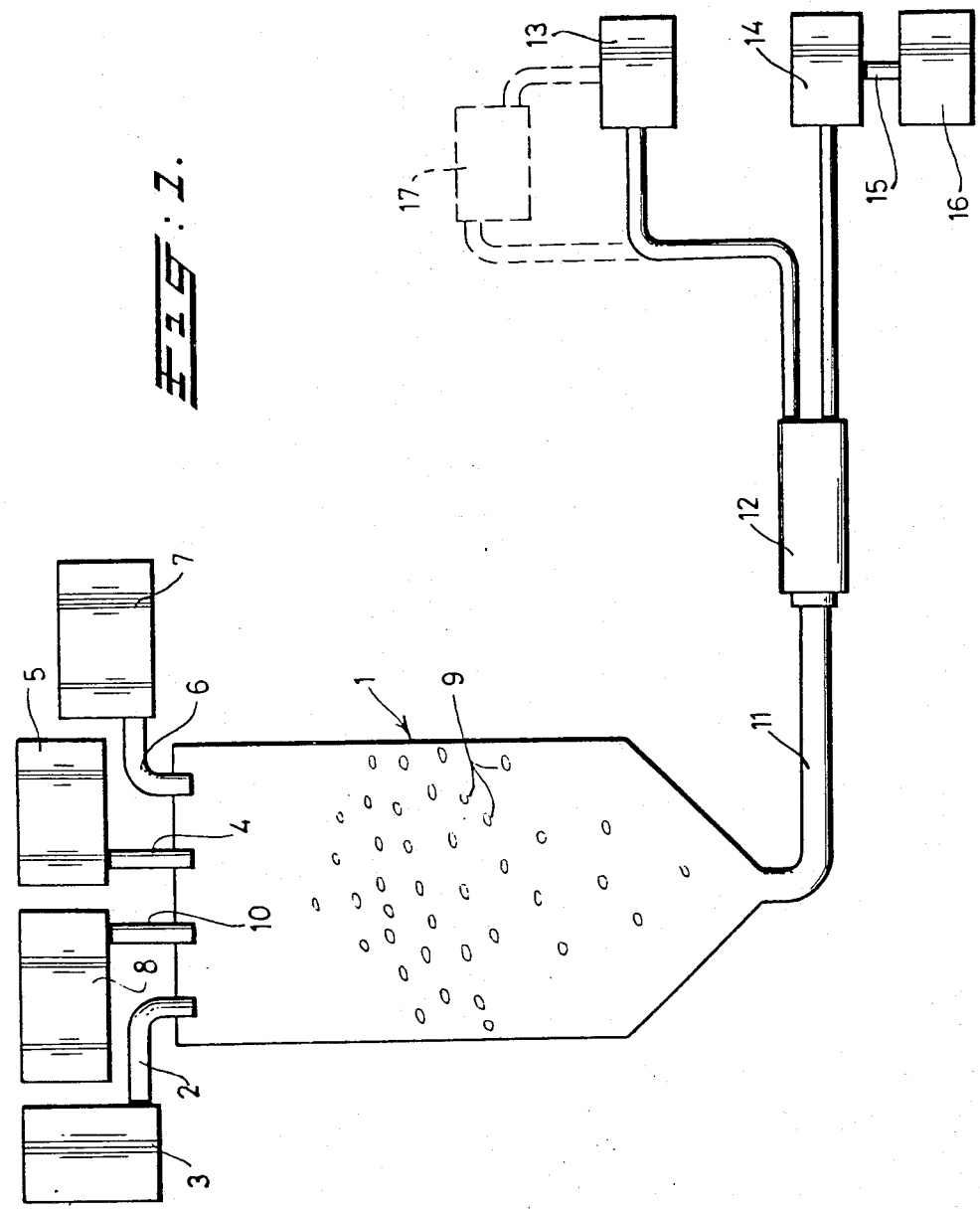
FIG. 2 is a preferred reactor.
Figure 2:
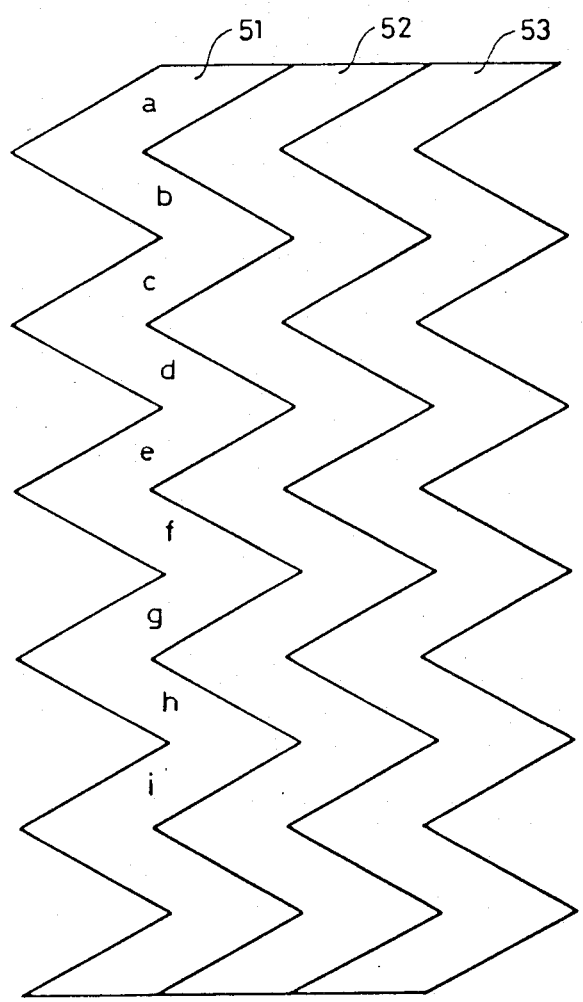

Referring now to FIG. 1 an apparatus in accordance with the invention comprises a mixing vessel 1, provided with an inlet 2 for a silica containing product, for which aim sand is supplied from a storage container 3, liquid fluid being supplied through an inlet 4 from a storage container 5. The liquid fluid generally consists of water.

Finally a calcium oxide product inlet 6 is provided for adding calcium oxide from a storage container 7. Said calcium oxide product may also be a cement.

The apparatus further comprises a storage container 8 for the receipt of heat absorbing particles 9, which are added to the mixing vessel through inlet 10.

The lower side of the mixing vessel tapers and comprises a mixing vessel outlet 11, so as to discharge the mixture with the removable particles from said mixing vessel.

The mixture is subsequently conveyed to a sieving installation 12, where the removable particles are removed and discharged toward a particle storage container 13, whilst the mixture proper is discharged toward a storage container 14, wherefrom it may be used for shaping, for instance, calcium sandstone in unit 16, after sand has been added through an additional sand supply 15 and been mixed with the mixture.

If a cylindrical reactor is used for curing articles, containing a calcium oxide product and a silica product sometimes the moist granules as formed are not sufficiently form-stabilized and thus these granules are flattened by pressure.

FIG. 2 now shows a reactor comprising a plurality of zones 51, 52, and 53 for curing the granules. In order to decrease the pressure on the different particles being in the lower part of the reactor, due to the weight of granules being in the upper part, it is suggested to use a reactor having compartments a, b, c, d, e, f, g, h and i which are staggered with respect to each other. Thus, the granules formed by a granulator are protected against high forces.

The granules in the compartments a-i can be subjected to heating by e.g. heat obtained by reacting CaO with water, but also waste heat from electrical plants may be passed through the zones.

Preferably zome 51 is used for heating bigger granules, zone 52 for smaller granules and at last zone 53 may be used for smallest particles.

This also contributes to obtaining an excellent product as now in each zone granules of similar size can be heated. Granules of a similar size can be separated from a mixture by sieving.

The present invention will furthermore be illustrated in the following examples.

EXAMPLE I 82 parts by weight of fly ash, from a central station, are initially mixed with 18 parts by weight of Portland cement and subsequently with water, in ordr to obtain a mass which can be granulated in a granulating drum. The obtained granules are coated with sand particles.

Hereupon the respective granules are cured in a moist environment at a temperature of 95° C. during a period of at least half an hour and more preferably, during three hours. The granules so obtained are cured in a sufficient manner, so as to be used as additives in concrete.

EXAMPLE II

A mixture of fly ash and cement is mixed with water and granules are formed by extrusion in an extruder. The granules thus obtained are added as heat dischargers when mixing calcium oxide, water and fly ash, the material thus obtained then also being suitable for subsequently forming granules. The heat prevailing during the reaction of calcium oxide with water, serves in this case for activating the latent hydraulic properties.

After the aforedescribed mixing, the pre-shaped granules can be sieved out and be used as an aggregate for concrete.

EXAMPLE III

Fly ash, cement and water, are mixed, whereupon silica oxide containing particles in the form of sand particles, are deposited on the formed granules.

The granules so obtained are added to a mixing vessel in which a heat developing reaction occurs. This may for example be the slaking of calcium oxide, whereupon the respective granules will possess a considerable hardness, due to the heat occurring when slaking the calcium.

In the course of time said granules will become harder as yet, on the one hand by a binding of the cement and, on the other hand, by the reaction of calcium oxide with fly ash.

EXAMPLE IV

The foregoing example is repeated, but part of the fly ash is replaced by sand, clay or plaster materials or other substances, suitable for the respective mixture.

EXAMPLE V

Granules are formed and added to a mixture of calcium oxide, water and sand, which mixture contains e.g. 35% of calcium oxide. During the mixture, a large quantity of heat is emitted, because of the reaction of calcium oxide and water. The mass, obtained from the mixing vessel, is subsequently sieved, in order to separate the granulated material from fly ash and binder.

The sieved out mixture is subsequently mixed furthermore with sand so as to obtain a mixture containing approximately 5% or more of calcium oxide, whereupon calcium sandstone products are formed by a hydrothermal curing process.

EXAMPLE VI

Example I is repeated, but a foaming means is added, for varying the volume weight of the granules from 0,3 to 1,8 kg/l. The foaming means is casein. Porous particles are obtained by firstly heating the water with casein.

EXAMPLE VII

Example I is repeated, and aluminium powder is added which aluminium powder will react with calcium hydroxide and form hydrogen, causing the granules to get porous. By suitably choosing the added quantity of aluminium powder, the volume weight of the particles may be adjusted to a ratio comprised between 0,3 and 1,8 kg/l. Granules with closed cells are obtained in this way.

EXAMPLE VIII

Quartz powder is mixed with a percentage of 35% of calcium oxide and is supplied to the mixing vessel 1 of FIG. 1. Simultaneously the quantity of water required for binding said calcium oxide is supplied, thus forming calcium hydroxide. Due to the large quantity of calcium, the temperature in the vessel will rise to over 100° C., so that sand with calcium oxide may be ejected from the mixing vessel 1.

In order to dispense with said problem, a quantity of removable gravel particles is supplied to the mixing vessel, simultaneously with the quartz powder and the calcium oxide. Said removable gravel particles 9 will absorb the exerted heat, so that a temperature of 65° will prevail in the lower side of the vessel.

The mixture obtained via outlet 11 of the mixing vessel 1, is supplied to the separating unit 12, at which location the removable gravel particles 9 can be recovered.

Said gravel particles may now be guided through a water bath 17, in which the heat of the particles is transmitted to an aqueous fluid which may subsequently be used for heating purposes, such as, for instance, for city heating circuits. On the other hand, a mixture is obtained, which lends itself well for making shaped products by means of a hydrothermal curing process.

EXAMPLE IX

Example I is repeated while adding removable particles and sand particles, instead of quartz powder.

The obtained mixture contains 25% of calcium and is subsequently mixed with sand in order to obtain a mixture comprising approximately 6% of calcium. The latter mixture lends itself well for providing excellent hydrothermally cured, shaped products.

EXAMPLE X

Example IX is repeated, but in this case heat absorbing particles are applied which are obtained as follows.

An iron containing residue, derived from steel producing industries is mixed with a mixture of silica dioxide and calcium oxide, although calcium oxide only may be employed as well. The relative mixture is granulated by extruding, whereupon a mixture of ground sand is spread upon the formed grains, which mixture will then form a coating around said grains. After the respective grains have been sufficiently coated with said binder, the granulated material is used as in Example I, instead of removable gravel particles.

EXAMPLE XI

The preceding example is repeated, but presently removable particles are employed, comprising fly ash as a filler. In this manner cured products being very suitable for replacing gravel in concrete, are also obtained.

EXAMPLE XII

Removable particles according to example X are employed, which particles contain a blowing means in the form of aluminium powder. Said removable particles are in this way provided with whether or not closed cells. Their volume weight is comprised between 0,3 to 1,8 kg/l.

When aluminium powder is employed, the respective particles should contain calcium hydroxide in order to incur the desired reaction between aluminium powder and calcium hydroxide. When a foaming means, such as casein is used, particles having whether or not closed cells, are obtained as well.

Although the present invention has been shown and described in connection with preferred embodiments and examples thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A process for forming granules by simultaneously mixing water, calcium oxide, and fly ash obtained from combustion of coal at elevated temperatures, forming granules of said mixture and curing said granules at a temperature between about 30° C. and about 100° C.

2. The process of claim 1 wherein the granules are cured at a temperature between 50° C. and 100° C.

3. The process of claim 1 wherein the heat for the curing step is obtained by mixing silica oxide-containing substances and calcium oxide wherein the quantity of calcium oxide in the mixture to be prepared contains more than 5% by weight.

4. The process of claim 1 comprising the following measures:
   (a) heat absorbing particles are added to the calcium oxide product, which heat absorbing particles are removed after a final calcium hydroxide containing product has been shaped;
   (b) the heat absorbing particles are removed from the final product and are conveyed through a heat delivering region;
   (c) the heat absorbing particles consist of silica granulate;
   (d) the heat absorbing particles consist, at least partially, of a reactive mixture;
   (e) the heat absorbing particles consist of a mixture of calcium oxide and silica oxide containing substances;
   (f) the heat absorbing particles comprise at least a filler;
   (g) the heat absorbing particles contain a foaming means;
   (h) the filler forms the core of the heat absorbing particles, said core being coated by a silica containing reactive substance;
   (i) 20 to 30% of calcium oxide is introduced into the respective mixture;
   (j) the mixture is mixed with a silica containing substance after having removed the removable particles.

5. Process according to claim 1, wherein the product to be cured or to absorb heat is passed through compartments which are staggered with respect to each other.

* * * * *